United States Patent
Ellison et al.

(10) Patent No.: US 11,735,724 B2
(45) Date of Patent: Aug. 22, 2023

(54) SILICON-CONTAINING NEGATIVE ELECTRODES, ELECTROCHEMICAL CELLS, AND METHODS OF MAKING THE SAME

(71) Applicant: GM GLOBAL TECHNOLOGY OPERATIONS LLC, Detroit, MI (US)

(72) Inventors: Nicole Ellison, Madison Heights, MI (US); Xiaosong Huang, Novi, MI (US); Lei Wang, Rochester Hills, MI (US); Xingyi Yang, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 232 days.

(21) Appl. No.: 17/085,785

(22) Filed: Oct. 30, 2020

(65) Prior Publication Data
US 2022/0140324 A1   May 5, 2022

(51) Int. Cl.
| | |
|---|---|
| *H01M 4/38* | (2006.01) |
| *H01M 4/133* | (2010.01) |
| *H01M 4/62* | (2006.01) |
| *H01M 4/134* | (2010.01) |
| *H01M 4/131* | (2010.01) |
| *H01M 4/525* | (2010.01) |
| *H01M 4/36* | (2006.01) |
| *H01M 4/1395* | (2010.01) |
| *H01M 4/1393* | (2010.01) |

(Continued)

(52) U.S. Cl.
CPC ......... *H01M 4/386* (2013.01); *H01M 4/0471* (2013.01); *H01M 4/131* (2013.01); *H01M 4/133* (2013.01); *H01M 4/134* (2013.01); *H01M 4/1391* (2013.01); *H01M 4/1393* (2013.01); *H01M 4/1395* (2013.01); *H01M 4/364* (2013.01); *H01M 4/505* (2013.01); *H01M 4/525* (2013.01); *H01M 4/622* (2013.01); *H01M 2004/027* (2013.01)

(58) Field of Classification Search
CPC ..... H01M 4/134; H01M 4/1395; H01M 4/386
See application file for complete search history.

(56) References Cited

U.S. PATENT DOCUMENTS

| | | |
|---|---|---|
| 7,736,805 B2 | 6/2010 | Nazri et al. |
| 8,101,152 B1 | 1/2012 | Halalay et al. |

(Continued)

FOREIGN PATENT DOCUMENTS

| | | |
|---|---|---|
| CN | 114447279 A | 5/2022 |
| DE | 102021113544 A1 | 5/2022 |

*Primary Examiner* — Ula C Ruddock
(74) *Attorney, Agent, or Firm* — Harness, Dickey & Pierce, P.L.C.

(57) ABSTRACT

A negative electrode is provided herein as well as methods for preparing negative electrodes and electrochemical cells including the negative electrode. The negative electrode includes a first electroactive material, an electrically conductive material, and a polymeric binder. The first electroactive material includes silicon-containing particles having an average particle diameter of at least about 1 μm, and the electrically conductive material includes graphene nanoplatelets. The polymeric binder includes a polyimide, a polyamide, polyacrylonitrile, polyacrylic acid, a salt of polyacrylic acid, polyacrylamide, polyvinyl alcohol, carboxymethyl cellulose, or a combination thereof.

20 Claims, 6 Drawing Sheets

(51) Int. Cl.
  *H01M 4/1391* (2010.01)
  *H01M 4/04* (2006.01)
  *H01M 4/505* (2010.01)
  *H01M 4/02* (2006.01)

(56) References Cited

U.S. PATENT DOCUMENTS

| | | |
|---|---|---|
| 8,399,138 B2 | 3/2013 | Timmons |
| 8,420,259 B2 | 4/2013 | Xiao et al. |
| 8,440,350 B1 | 5/2013 | Verbrugge et al. |
| 8,642,201 B2 | 2/2014 | Cheng et al. |
| 8,658,295 B2 | 2/2014 | Cheng et al. |
| 8,679,680 B2 | 3/2014 | Vanimisetti et al. |
| 8,828,481 B2 | 9/2014 | Burton et al. |
| 8,835,056 B2 | 9/2014 | Xiao et al. |
| 8,859,144 B2 | 10/2014 | Xiao |
| 8,999,584 B2 | 4/2015 | Jiang et al. |
| 9,005,811 B2 | 4/2015 | Xiao et al. |
| 9,012,075 B2 | 4/2015 | Verbrugge et al. |
| 9,034,519 B2 | 5/2015 | Xiao et al. |
| 9,093,705 B2 | 7/2015 | Xiao et al. |
| 9,142,830 B2 | 9/2015 | Xiao et al. |
| 9,153,819 B2 | 10/2015 | Huang et al. |
| 9,302,914 B2 | 4/2016 | Liu et al. |
| 9,356,281 B2 | 5/2016 | Verbrugge et al. |
| 9,362,551 B2 | 6/2016 | Sachdev et al. |
| 9,362,552 B2 | 6/2016 | Sohn et al. |
| 9,379,374 B2 | 6/2016 | Liu et al. |
| 9,531,004 B2 | 12/2016 | Xiao et al. |
| 9,564,639 B2 | 2/2017 | Huang |
| 9,570,752 B2 | 2/2017 | Huang et al. |
| 9,577,251 B2 | 2/2017 | Xiao et al. |
| 9,583,767 B2 | 2/2017 | Verbrugge et al. |
| 9,780,361 B2 | 10/2017 | Xiao et al. |
| 10,062,898 B2 | 8/2018 | Xiao |
| 10,164,245 B2 | 12/2018 | Huang |
| 10,326,136 B2 | 6/2019 | Xiao et al. |
| 2012/0100403 A1 | 4/2012 | Wang et al. |
| 2012/0229096 A1 | 9/2012 | Nazri |
| 2012/0328927 A1 | 12/2012 | Timmons et al. |
| 2013/0099159 A1 | 4/2013 | Halalay et al. |
| 2015/0147646 A1* | 5/2015 | McGee ............... C09D 143/02 252/511 |
| 2017/0098817 A1 | 4/2017 | Yu et al. |
| 2018/0013135 A1* | 1/2018 | Lau ................. H01M 4/485 |
| 2018/0205114 A1 | 7/2018 | Pauric et al. |
| 2018/0241033 A1* | 8/2018 | Do ....................... H01M 4/587 |
| 2018/0241037 A1* | 8/2018 | Bridel ................. H01M 4/133 |
| 2018/0375156 A1* | 12/2018 | Zhamu ................ C07C 21/04 |
| 2019/0260011 A1* | 8/2019 | Ho ..................... H01M 4/1395 |
| 2020/0020949 A1 | 1/2020 | Huang |
| 2020/0119339 A1 | 4/2020 | Halalay et al. |
| 2020/0127292 A1 | 4/2020 | Halalay et al. |
| 2020/0220153 A1 | 7/2020 | Xiao et al. |
| 2020/0220154 A1 | 7/2020 | Xiao et al. |

* cited by examiner

SILICON-CONTAINING NEGATIVE ELECTRODES, ELECTROCHEMICAL CELLS, AND METHODS OF MAKING THE SAME

FIELD

The present disclosure relates to silicon-containing negative electrodes that also include graphene nanoplatelets as an electrically conductive material, methods for making the silicon-containing negative electrodes, and electrochemical cells including the silicon-containing negative electrode.

BACKGROUND

This section provides background information related to the present disclosure which is not necessarily prior art.

High-energy density, electrochemical cells, such as lithium ion batteries can be used in a variety of consumer products and vehicles, such as Hybrid Electric Vehicles (HEVs) and Electric Vehicles (EVs). Typical lithium ion batteries comprise a first electrode (e.g., a cathode), a second electrode of opposite polarity (e.g., an anode), an electrolyte material, and a separator. Conventional lithium ion batteries operate by reversibly passing lithium ions between the negative electrode and the positive electrode. A separator and an electrolyte are disposed between the negative and positive electrodes. The electrolyte is suitable for conducting lithium ions and may be in solid, semi-solid or liquid form. Lithium ions move from a cathode (positive electrode) to an anode (negative electrode) during charging of the battery, and in the opposite direction when discharging the battery. For convenience, a negative electrode will be used synonymously with an anode, although as recognized by those of skill in the art, during certain phases of lithium ion cycling the anode function may be associated with the positive electrode rather than negative electrode (e.g., the negative electrode may be an anode on discharge and a cathode on charge).

In various aspects, an electrode includes an electroactive material. Negative electrodes typically comprise such an electroactive material that is capable of functioning as a lithium host material serving as a negative terminal of a lithium ion battery. Conventional negative electrodes include the electroactive lithium host material and optionally another electrically conductive material, such as carbon black particles, as well as one or more polymeric binder materials to hold the lithium host material and electrically conductive particles together.

Typical electroactive materials for forming a negative electrode (e.g., an anode) in a lithium ion electrochemical cell include lithium-graphite intercalation compounds, lithium-silicon alloys, lithium-tin compounds, and other lithium alloys. While graphite compounds are most common, recently, anode materials with high specific capacity (in comparison with conventional graphite) are of growing interest. For example, silicon has one of the highest known theoretical capacities for lithium, making it one of the most attractive alternatives to graphite as a negative electrode material for rechargeable lithium ion batteries. However, current silicon anode materials suffer from significant drawbacks. For example, silicon-containing materials experience large volume changes (e.g., volume expansion/contraction) during lithium insertion/extraction (e.g., intercalation and deintercalation). Moreover, the initial lithiation process of silicon-based electroactive materials can promote an increase in surface roughness. Further, additional volumetric changes may occur during successive charging and discharging cycles for silicon electroactive materials. Such volumetric changes can lead to fatigue cracking and decrepitation of the electroactive material. This may potentially lead to a loss of electrical contact between the silicon-containing electroactive material and the rest of the battery cell as well as the consumption of electrolyte to form new solid electrolyte interface (SEI), resulting in a decline of electrochemical cyclic performance, diminished Coulombic charge capacity retention (capacity fade), and limited cycle life.

It would be desirable to develop high performance electrode materials, particularly comprising silicon, and methods for preparing such high performance electrode materials for use in high energy and high power lithium ion batteries, which overcome the current shortcomings that prevent their widespread commercial use, especially in vehicle applications. Accordingly, it would be desirable to develop methods of making electroactive materials comprising silicon or other electroactive materials that undergo significant volumetric changes during lithium ion cycling that are capable of minimal capacity fade and maximized charge capacity in commercial lithium ion batteries with long lifespans, especially for transportation applications. For long term and effective use, high specific capacity electrode materials, such as silicon, should be capable of minimal capacity fade and maximized charge capacity for long-term use in lithium ion batteries.

SUMMARY

This section provides a general summary of the disclosure and is not a comprehensive disclosure of its full scope or all of its features.

In certain aspects, the present disclosure provides a negative electrode. The negative electrode includes a first electroactive material including silicon-containing particles having an average particle diameter of at least about 1 μm, an electrically conductive material including graphene nanoplatelets, and a polymeric binder including a polyimide, a polyamide, polyacrylonitrile, polyacrylic acid, a salt of polyacrylic acid, polyacrylamide, polyvinyl alcohol, carboxymethyl cellulose, or a combination thereof.

The silicon-containing particles have an average particle diameter of about 1 μm to about 15 μm. The graphene nanoplatelets have one or more of: (i) an average particle diameter of about 1 μm to about 25 μm; and (ii) a thickness of less than or equal to about 100 nm.

The silicon-containing particles include silicon, carbon coated silicon, a silicon oxide, a lithium silicon alloy, a silicon tin alloy, a silicon iron alloy, a silicon aluminum alloy, a silicon cobalt alloy, or a combination thereof.

The electrically conductive material further includes carbon black, acetylene black, graphite, carbon nanotubes, carbon fibers, carbon nanofibers, graphene, graphene oxide, nitrogen-doped carbon, a metallic powder, a liquid metal, a conductive polymer, or a combination thereof.

The first electroactive material is present in the negative electrode in an amount of about 60 wt % to about 95 wt %, based on total weight of the negative electrode. The electrically conductive material is present in the negative electrode in an amount of about 2 wt % to about 20 wt %, based on total weight of the negative electrode. The polymeric binder is present in the negative electrode in an amount of about 3 wt % to about 20 wt %, based on total weight of the negative electrode.

In yet other aspects, the present disclosure provides an electrochemical cell. The electrochemical cell includes a negative electrode, a positive electrode, wherein the positive electrode is spaced apart from the negative electrode, a porous separator disposed between confronting surfaces of the negative electrode and the positive electrode, and a liquid electrolyte infiltrating the negative electrode, the positive electrode, and the porous separator. The negative electrode includes a first electroactive material including silicon-containing particles having an average particle diameter of at least about 1 μm, an electrically conductive material including graphene nanoplatelets, and a polymeric binder including a polyimide, a polyamide, polyacrylonitrile, polyacrylic acid, a salt of polyacrylic acid, polyacrylamide, polyvinyl alcohol, carboxymethyl cellulose, or a combination thereof. The positive electrode includes a second electroactive material.

The silicon-containing particles have an average particle diameter of about 1 μm to about 15 μm. The graphene nanoplatelets have one or more of: (i) an average particle diameter of about 1 μm to about 25 μm; and (ii) a thickness of less than or equal to about 100 nm.

The silicon-containing particles include silicon, carbon coated silicon, a silicon oxide, a lithium silicon alloy, a silicon tin alloy, a silicon iron alloy, a silicon aluminum alloy, a silicon cobalt alloy, or a combination thereof.

The electrically conductive material further includes carbon black, acetylene black, graphite, carbon nanotubes, carbon fibers, carbon nanofibers, graphene, graphene oxide, nitrogen-doped carbon, a metallic powder, a liquid metal, a conductive polymer, or a combination thereof.

The first electroactive material is present in the negative electrode in an amount of about 60 wt % to about 95 wt %, based on total weight of the negative electrode. The electrically conductive material is present in the negative electrode in an amount of about 2 wt % to about 20 wt %, based on total weight of the negative electrode. The polymeric binder is present in the negative electrode in an amount of about 3 wt % to about 20 wt %, based on total weight of the negative electrode.

The second electroactive material is selected from the group consisting of $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2FePO_4F$; $LiMn_2O_4$; $LiFeSiO_4$; $LiNi_{0.6}Mn_{0.2}Co_{0.2}O_2$ (NMC622), $LiMnO_2$ (LMO), activated carbon, sulfur, and a combination thereof.

The electrochemical cell has a negative electrode capacity for lithium to positive electrode capacity for lithium (N/P) ratio of about 1 to about 3.

In yet other aspects, the present disclosure provides a method of preparing a negative electrode. The method includes admixing a first electroactive material with an electrically conductive material, a polymeric binder, and a non-aqueous solvent to form a slurry. The method further includes applying the slurry to a current collector and volatilizing the slurry to form the negative electrode, and a first heat treatment of the negative electrode including heating the negative electrode at a first temperature of less than or equal to about 400° C. The first electroactive material includes silicon-containing particles having an average particle diameter of greater than or equal to about 1 μm. The electrically conductive material includes graphene nanoplatelets. The polymeric binder includes a polyimide, a polyamide, polyacrylonitrile, polyacrylic acid, a salt of polyacrylic acid, polyacrylamide, polyvinyl alcohol, carboxymethyl cellulose, or a combination thereof.

The electrically conductive material is admixed with the non-aqueous solvent to form a first mixture, the first mixture is admixed with the first electroactive material to form a second mixture, and the second mixture is admixed with polymeric binder to form the slurry. Alternatively, the polymeric binder is admixed with the non-aqueous solvent to form a first mixture, the electrically conductive material is admixed with the non-aqueous solvent to form a second mixture, the second mixture is admixed with the first electroactive material to form a third mixture, and the first mixture is admixed with third mixture to form the slurry. Alternatively, the polymeric binder is admixed with the non-aqueous solvent and the first electroactive material to form a first mixture, the electrically conductive material is admixed with the non-aqueous solvent and the polymeric binder to form a second mixture, and the first mixture is admixed with the second mixture to form the slurry.

The silicon-containing particles have an average particle diameter of about 1 μm to about 15 μm. The graphene nanoplatelets have one or more of: (i) an average particle diameter of about 1 μm to about 25 μm; and (ii) a thickness of less than or equal to about 100 nm.

The silicon-containing particles include silicon, carbon coated silicon, a silicon oxide, a lithium silicon alloy, a silicon tin alloy, a silicon iron alloy, a silicon aluminum alloy, a silicon cobalt alloy, or a combination thereof; and wherein the non-aqueous solvent is selected from the group consisting of N-methyl-2-pyrrolidone (NMP), dimethylformamide (DMF), dimethyl sulfoxide, propylene carbonate, acetonitrile, tetrahydrofuran, and a combination thereof.

The electrically conductive material further includes carbon black, acetylene black, graphite, carbon nanotubes, carbon fibers, carbon nanofibers, graphene, graphene oxide, nitrogen-doped carbon, a metallic powder, a liquid metal, a conductive polymer, or a combination thereof.

The slurry includes (i) about 60 wt % to about 95 wt % of the first electroactive material, based on total weight of the slurry, (ii) about 2 wt % to about 20 wt % of the first electroactive material, based on total weight of the slurry, and (iii) about 3 wt % to about 20 wt % of the polymeric binder, based on total weight of the slurry.

The method further includes a second heat treatment of the negative electrode including heating the negative electrode at a second temperature of greater than or equal to about 400° C.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
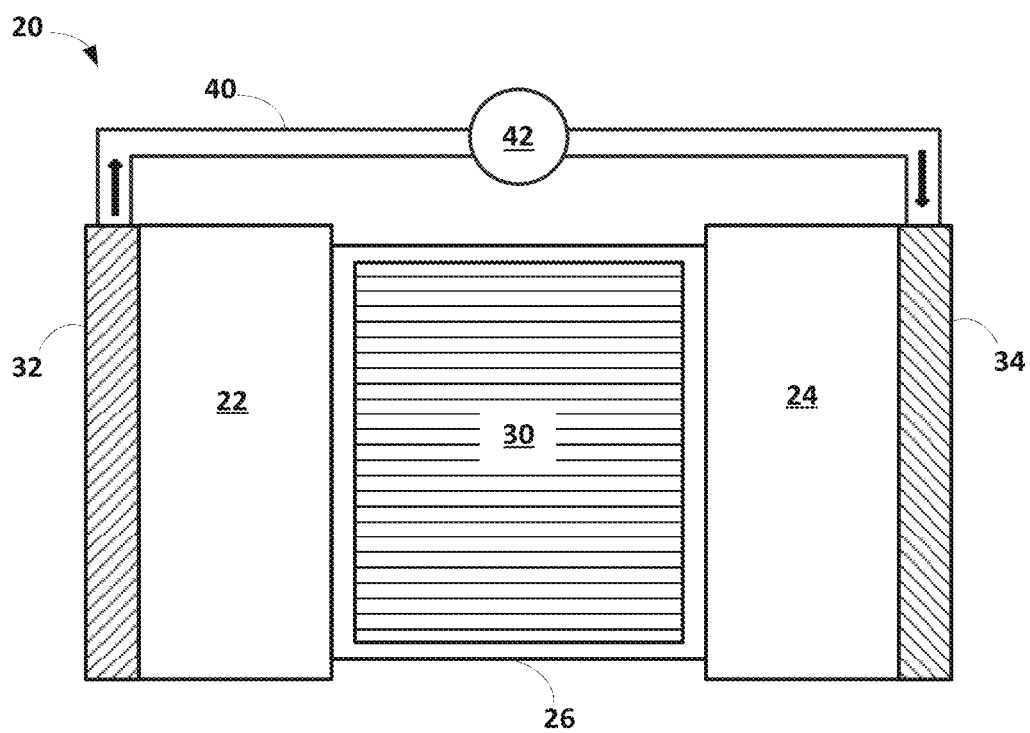
FIG. 1 is a schematic of an exemplary electrochemical battery cell.

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," "attached to," or "coupled to" another element or layer, it may be directly on, engaged, connected, attached or coupled to the other component, element, or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure pertains to high-performance lithium ion electrochemical cells (e.g., lithium ion batteries) having improved electrodes and methods of making the same. In lithium ion electrochemical cells or batteries, a negative electrode typically includes a lithium insertion material or an alloy host material. As discussed above, conventional electroactive materials for forming a negative electrode or anode include lithium-graphite intercalation compounds, lithium-silicon alloys, lithium-tin compounds, and other lithium alloys. While graphite compounds are most commonly used, certain anode materials with high specific capacity (in comparison with conventional graphite) are of growing interest. Silicon (Si), silicon oxide, and tin are attractive alternatives to graphite as an anode material for rechargeable lithium ion batteries due to their high theoretical capacity. However, silicon-containing materials can experience large volume changes (e.g., volume expansion/contraction) during lithium insertion/extraction (e.g., intercalation and deintercalation), which can lead to fatigue cracking and decrepitation of the electroactive material. These challenges have been a barrier to their widespread use in lithium ion batteries. Thus, silicon-containing negative electrodes and methods of making such negative electrodes with a robust mechanical and electrical network are needed.

The present disclosure provides improved electrodes and methods of making improved electrodes for an electrochemical cell, which can address the above-described challenges. For example, an exemplary and schematic illustration of an electrochemical cell (also referred to as the lithium ion battery or battery) 20 is shown in FIG. 1. Electrochemical cell 20 includes a negative electrode 22 (also referred to as a negative electrode layer 22), a positive electrode 24 (also referred to as a positive electrode layer 24), and a separator 26 (e.g., a microporous polymeric separator) disposed between the two electrodes 22, 24. The space between (e.g., the separator 26) the negative electrode 22 and positive electrode 24 can be filled with the electrolyte 30. If there are pores inside the negative electrode 22 and positive electrode 24, the pores may also be filled with the electrolyte 30. In alternative embodiments, a separator 26 is not included if a solid electrolyte is used. A negative electrode current collector 32 may be positioned at or near the negative electrode, 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load device 42 connects the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the battery 20. The separator 26 also contains the electrolyte solution in a network of open pores during the cycling of lithium ions, to facilitate functioning of the battery 20.

The battery 20 can generate an electric current during discharge by way of reversible electrochemical reactions that occur when the external circuit 40 is closed (to connect the negative electrode 22 and the positive electrode 24) when the negative electrode 22 contains a relatively greater quantity of inserted lithium. The chemical potential difference between the positive electrode 24 and the negative electrode 22 drives electrons produced by the oxidation of inserted lithium at the negative electrode 22 through the external circuit 40 toward the positive electrode 24. Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 40 can be harnessed and directed through the load device 42 until the inserted lithium in the negative electrode 22 is depleted and the capacity of the lithium ion battery 20 is diminished.

The lithium ion battery 20 can be charged or re-powered/re-energized at any time by connecting an external power source to the lithium ion battery 20 to reverse the electrochemical reactions that occur during battery discharge. The connection of an external power source to the lithium ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with inserted lithium for consumption during the next battery discharge event. As such, a complete discharging event followed by a complete charging event is considered to be a cycle, where lithium ions are cycled between the positive electrode 24 and the negative electrode 22. The external power source that may be used to charge the lithium ion battery 20 may vary depending on the size, construction, and particular end-use of the lithium ion battery 20. Some notable and exemplary external power sources include, but are not limited to, an AC wall outlet and a motor vehicle alternator.

In many battery configurations, each of the negative current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package. The negative electrode current collector 32 and positive electrode current collector 34 respectively collect and move free electrons to and from an external circuit 40.

Furthermore, the battery 20 can include a variety of other components that while not depicted here are nonetheless known to those of skill in the art. For instance, the lithium ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. The battery 20 shown in FIG. 1 includes a liquid electrolyte 30 and shows representative concepts of battery operation. However, the battery 20 may also be a solid-state battery that includes a solid-state electrolyte that may have a different design, as known to those of skill in the art.

As noted above, the size and shape of the lithium ion battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium ion cells or batteries to produce a greater voltage output and power density if it is required by the load device 42.

Accordingly, the battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the battery 20 for purposes of storing energy.

The present technology pertains to improved electrochemical cells, especially lithium-ion batteries. In various instances, such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20.

In certain aspects, the electrolyte 30 may be a non-aqueous liquid electrolyte solution that includes one or more lithium salts dissolved in an organic solvent or a mixture of organic solvents. For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl) imide ($LiN(FSO_2)_2$) (Li SFI), and combinations thereof.

These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof. In some embodiments, the electrolyte includes fluoroethylene carbonate (FEC) as the solvent.

The separator 26 may comprise, for example, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous separator membranes include CELGARD® 2500 (a monolayer polypropylene separator) and CELGARD® 2320 (a trilayer polypropylene/polyethylene/polypropylene separator) available from Celgard LLC.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), and combinations thereof. The heat-resistant material may be selected from the group consisting of: Nomex, Aramid, and combinations thereof.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics. In certain aspects, the separator 26 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 26 are contemplated, as well as the many manufacturing methods that may be employed to produce such a microporous polymer separator 26.

In various aspects, the porous separator 26 and the electrolyte 30 in FIG. 1 may be replaced with a solid-state electrolyte (SSE) (not shown) that functions as both an electrolyte and a separator. The SSE may be disposed between the positive electrode 24 and negative electrode 22. The SSE facilitates transfer of lithium ions, while mechanically separating and providing electrical insulation between the negative and positive electrodes 22, 24. By way of non-limiting example, SSEs may include $LiTi_2(PO4)_3$, $LiGe_2(PO_4)_3$, $Li_7La_3Zr_2O_{12}$, $Li_{3x}La_{2/3}$-$xTiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, or combinations thereof.

In various aspects, a negative electrode (e.g., negative electrode 22) is provided herein. The negative electrode 22 includes a first electroactive material comprising a lithium host material capable of functioning as a negative terminal of a lithium ion battery. In any embodiment, the first electroactive material includes a silicon-containing material. The silicon-containing electroactive material can comprise silicon, carbon coated silicon, a silicon oxide, a lithium silicon alloy, a silicon tin alloy, a silicon iron alloy, a silicon aluminum alloy, a silicon cobalt alloy, or a combination thereof. Examples of silicon-containing alloys, such as binary and ternary alloys, include but are not limited, to Si—Sn, SiSnFe, SiSnAl, SiFeCo, and the like. In certain embodiments, the silicon-containing electroactive material comprises or consists essentially of silicon (rather than an alloy of silicon) in either crystalline or amorphous structures. Carbon coated silicon particles and methods of forming such particles are described in U.S. patent application Ser. No. 16/668,882, which is incorporated herein by reference in its entirety. For example, the silicon-containing particles may include a continuous intermediate layer comprising carbides disposed on a surface of the silicon-containing particles and a continuous carbon coating disposed adjacent to the continuous intermediate layer. The continuous carbon coating may be a multilayered carbon coating comprising an inner first layer comprising amorphous carbon disposed adjacent to the continuous intermediate layer and an outer second layer comprising graphitic carbon. In some embodiments, the first electroactive material can be pre-lithiated via techniques known in the art.

The silicon-containing electroactive material may have a round geometry or an axial geometry and thus may be in the form of particles or in alternative variations, may be in the form of thin film, nanowires, nanorods, nanosprings, or hollow tubes. In particular, the silicon-containing electroactive material is present as silicon-containing particles. The silicon-containing electroactive material structures, e.g., silicon structures, may be nanometer sized or micrometer sized, preferably micrometer sized. Such silicon structures can help accommodate the large volume changes that silicon undergoes during lithium cycling in a lithium ion battery. The term "axial geometry" refers to particles generally having a rod, fibrous, or otherwise cylindrical shape having an evident long or elongated axis. Generally, an aspect ratio (AR) for cylindrical shapes (e.g., a fiber or rod) is defined as AR=L/D where L is the length of the longest axis and D is the diameter of the cylinder or fiber. Exemplary axial-geometry electroactive material particles suitable for use in the present disclosure may have high aspect ratios, ranging from about 10 to about 5,000, for example. In certain variations, the first electroactive material particles having an axial-geometry include fibers, wires, flakes, whiskers, filaments, tubes, rods, and the like.

The term "round geometry" typically applies to particles having lower aspect ratios, for example, an aspect ratio closer to 1 (e.g., less than 10). It should be noted that the particle geometry may vary from a true round shape and, for example, may include oblong or oval shapes, including prolate or oblate spheroids, agglomerated particles, polygonal (e.g., hexagonal) particles or other shapes that generally have a low aspect ratio. Oblate spheroids may have disc shapes that have relatively high aspect ratios. Thus, a generally round geometry particle is not limited to relatively low aspect ratios and spherical shapes. For silicon-containing electroactive material particles, an average particle size diameter of a suitable silicon-containing particle may be greater than or equal to about 10 nm, greater than or equal to about 100 nm, greater than or equal to about 1 µm, greater than or equal to about 2.5 µm, greater than or equal to about 5 µm, greater than or equal to about 7.5 µm, greater than or equal to about 10 µm, greater than or equal to about 12.5 µm, greater than or equal to about 15 µm, greater than or equal to about 17.5 µm, greater than or equal to about 20 µm, or about 25 µm; or from about 10 nm to about 25 µm, about 100 nm to about 20 µm, about 1 µm to about 20 µm, about 1 µm to about 15 µm, or about 1 µm to about 10 µm.

Additionally, the negative electrode 22 can include an electrically conductive material and a polymeric binder. Examples of electrically conductive material include, but are not limited to, carbon black, graphite, acetylene black (such as KETCHEN™ black or DENKA™ black), carbon nanotubes, carbon fibers, carbon nanofibers, graphene, graphene nanoplatelets, graphene oxide, nitrogen-doped carbon, metallic powder (e.g., copper, nickel, steel), liquid metals (e.g., Ga, GaInSn), a conductive polymer (e.g., include polyaniline, polythiophene, polyacetylene, polypyrrole, and the like) and combinations thereof. Such electrically conductive material in particle form may have a round geometry or an axial geometry as described above. As used herein, the term "graphene nanoplatelet" refers to a nanoplate or stack of graphene layers. In a particular embodiment, the electrically conductive material comprises graphene nanoplatelets and optionally, one or more other electrically conductive materials listed above. In various aspects, the graphene nanoplatelets have an average particle diameter or lateral dimension of greater than or equal to about 100 nm, greater than or equal to about 1 μm, greater than or equal to about 5 μm, greater than or equal to about 10 μm, greater than or equal to about 15 μm, greater than or equal to about 20 μm, greater than or equal to about 25 μm, or about 30 μm; or from about 100 nm to about 30 μm, about 1 μm to about 25 μm, about 5 μm to about 25 μm, or about 10 μm to about 20 μm. Additionally or alternatively, the graphene nanoplatelets may have a thickness of less than or equal to about 250 nm, less than or equal to about 100 nm, less than or equal to about 50 nm, less than or equal to about 25 nm, less than or equal to about 10 nm, less than or equal to about 5 nm, or about 1 nm; or from about 1 nm to about 250 nm, about 1 nm to about 100 nm, about 1 nm to about 50 nm, about 1 nm to about 10 nm, or about 1 nm to about 5 nm. Additionally or alternatively, the electrically conductive material (e.g., graphene nanoplatelets) may have a surface area of greater than or equal to about 25 m$^2$/g, greater than or equal to about 50 m$^2$/g, greater than or equal to about 100 m$^2$/g, greater than or equal to about 250 m$^2$/g, greater than or equal to about 500 m$^2$/g, or about 750 m$^2$/g; from about 25 m$^2$/g to about 75 m$^2$/g, about 50 m$^2$/g to about 100 m$^2$/g, about 25 m$^2$/g to about 750 m$^2$/g, about 250 m$^2$/g to about 750 m$^2$/g, or about 500 m$^2$/g to about 750 m$^2$/g.

Figure 2:
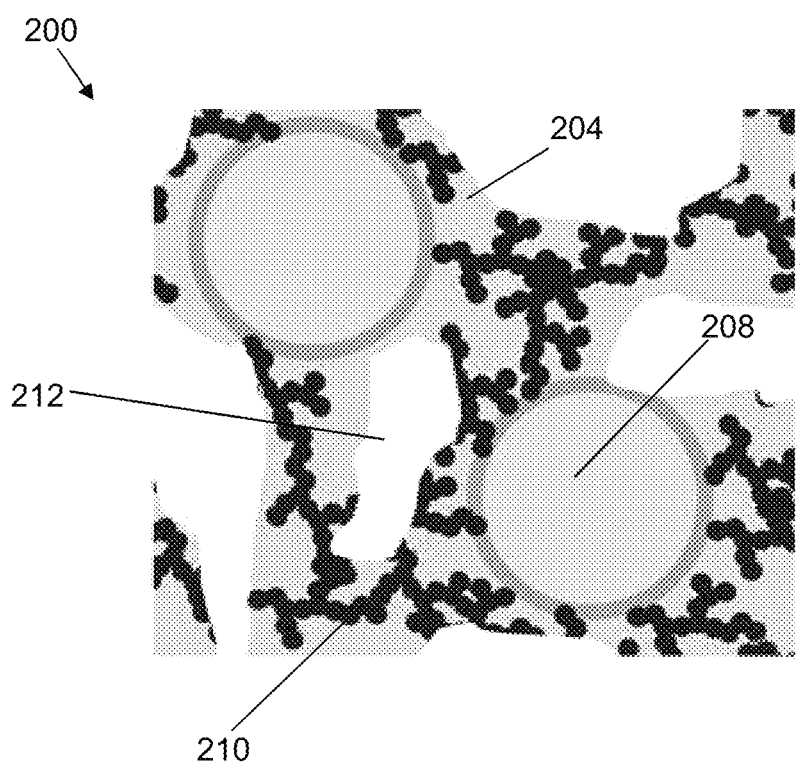
FIG. 2 is a schematic of an exemplary negative electrode.

As used herein, the term "polymeric binder" includes polymer precursors used to form the polymeric binder, for example, monomers or monomer systems that can form any one of the polymeric binders disclosed above. Examples of suitable polymeric binders, include but are not limited to, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), poly (acrylic acid) PAA, polyimide, polyamide, sodium alginate, lithium alginate, and combinations thereof. In some embodiments, the polymeric binder may be a non-aqueous solvent-based polymer or an aqueous-based polymer. In particular, the polymeric binder may be a non-aqueous solvent-based polymer that can demonstrate less capacity fade, provide a more robust mechanical network and improved mechanical properties to handle silicon particle expansion more effectively, and possess good chemical and thermal resistance. For example, the polymeric binder may include polyimide, polyamide, polyacrylonitrile, polyacrylic acid, a salt (e.g., potassium, sodium, lithium) of polyacrylic acid, polyacrylamide, polyvinyl alcohol, carboxymethyl cellulose, or a combination thereof. The first electroactive material may be intermingled with the electrically conductive material and at least one polymeric binder. For example, as depicted in FIG. 2, polymeric binder 204 can create a matrix retaining the first electroactive material 208 and electrically conductive material 210 in position within the negative electrode 200 with pores 212. Polymeric binder can fulfill multiple roles in an electrode, including: (i) enabling the electronic and ionic conductivities of the composite electrode, (ii) providing the electrode integrity, e.g., the integrity of the electrode and its components, as well as its adhesion with the current collector, and (iii) participating in the formation of solid electrolyte interphase (SEI), which plays an important role as the kinetics of lithium intercalation is predominantly determined by the SEI.

In various aspects, the first electroactive material may be present in the negative electrode in an amount, based on total weight of the negative electrode, of greater than or equal to about 50 wt %, greater than or equal to about 60 wt %, greater than or equal to about 70 wt %, greater than or equal to about 80 wt %, greater than or equal to about 90 wt %, greater than or equal to about 95 wt %, or about 98 wt %; or from about 50 wt % to about 98 wt %, about 60 wt % to about 95 wt %, about 70 wt % to about 95 wt %, or about 80 wt % to about 95 wt %. Additionally or alternatively, the electrically conductive material may be present in the negative electrode in an amount, based on total weight of the negative electrode, of greater than or equal to about 0.2 wt %, greater than or equal to about 1 wt %, greater than or equal to about 5 wt %, greater than or equal to about 10 wt %, greater than or equal to about 15 wt %, greater than or equal to about 20 wt %, or about 25 wt %; or from about 0.2 wt % to about 25 wt %, about 1 wt % to about 25 wt %, about 2 wt % to about 20 wt %, or about 2 wt % to about 10 wt %. Additionally or alternatively, the polymeric binder may be present in the negative electrode in an amount, based on total weight of the negative electrode, of greater than or equal to about 0.5 wt %, greater than or equal to about 1 wt %, greater than or equal to about 3 wt %, greater than or equal to about 5 wt %, greater than or equal to about 10 wt %, greater than or equal to about 15 wt %, greater than or equal to about 20 wt %, greater than or equal to about 25 wt %, or about 30 wt %; or from about 0.5 wt % to about 30 wt %, about 1 wt % to about 25 wt %, about 3 wt % to about 20 wt %, or about 3 wt % to about 10 wt %. In some embodiments, the negative electrode 22 may include: (i) the first electroactive material in an amount of about 60 wt % to about 95 wt % or about 75 wt % to about 95 wt %, based on total weight of the negative electrode; (ii) the electrically conductive material in an amount of about 0.2 wt % to about 20 wt % or about 2 wt % to about 20 wt %, based on total weight of the negative electrode; and (iii) the polymeric binder in an amount of about 1 wt % to about 30 wt % or about 3 wt % to about 20 wt %, based on total weight of the negative electrode.

The positive electrode 24 may be formed from a second electroactive material that can sufficiently undergo lithium intercalation and deintercalation while functioning as the positive terminal of the lithium ion battery 20. The positive electrode 24 may also include a polymeric binder material to structurally fortify the lithium-based active material and an electrically conductive material. One exemplary common class of known materials that can be used to form the positive electrode 24 is layered lithium transitional metal oxides. For example, in certain embodiments, the positive electrode 24 may comprise $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2FePO_4F$; $LiMn_2O_4$; $LiFeSiO_4$; $LiNi_{0.6}Mn_{0.2}Co_{0.2}O_2$ (NMC622), $LiMnO_2$ (LMO), activated carbon, sulfur (e.g., greater than 60 wt % based on total weight of the positive electrode), or combinations thereof.

In certain variations, the second electroactive materials may be intermingled with an electronically conductive material as described herein that provides an electron conduction path and/or at least one polymeric binder material as described herein that improves the structural integrity of the electrode. For example, the first electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), poly(acrylic acid) PAA, polyimide, polyamide, sodium alginate, or lithium alginate.

The positive electrode current collector 34 may be formed from aluminum (Al) or any other appropriate electrically conductive material known to those of skill in the art. The negative electrode current collector 32 may comprise a metal comprising copper, nickel, or alloys thereof, stainless steel, or other appropriate electrically conductive materials known to those of skill in the art. In certain aspects, the positive electrode current collector 34 and/or negative electrode current collector 32 may be in the form of a foil, slit mesh, and/or woven mesh.

Additionally, the electrochemical cell 20 can have a negative electrode capacity for lithium to positive electrode capacity for lithium (N/P) ratio of greater than or equal to about 1, greater than or equal to about 1.1, greater than or equal to about 1.3, greater than or equal to about 1.5, greater than or equal to about 1.7, greater than or equal to about 1.9, greater than or equal to about 2, greater than or equal to about 2.2, greater than or equal to about 2.4, greater than or equal to about 2.6, or about 3; or from about 1 to about 3, about 1 to about 2.6, about 1 to about 2.2, about 1 to about 2, about 1.3 to about 2, or about 1.5 to about 3. A person of ordinary skill in the art understands how to calculate the N/P ratio based upon the materials selected for the negative electrode and the positive electrode. Unless stated otherwise, the "N/P ratio" described herein refers to the ratio of the areal capacity of the negative electrode to the areal capacity of the positive electrode.

Methods of preparing a negative electrode (e.g., negative electrode 22) are also provided herein. The methods described herein can be advantageously used for small-scale or large-scale processes. In various aspects, the methods include admixing a first electroactive material as described herein with an electrically conductive material as described herein, a polymeric binder as described herein, and a non-aqueous solvent to form a slurry. For example, the first electroactive material may comprise silicon-containing particles as described herein and the electrically conductive material may comprise graphene nanoplatelets. The various materials can be blended or mixed by methods and equipment known in the art, such as for example, resonance dispersion, sonic and ultrasonic dispersion, centrifugal force, magnetic stirrers, mixers (e.g., planetary, rotary), kneaders, and the like. Optionally, the electroactive material may be milled, for example, using about 1 mm to about 2 mm milling media for up to an hour at a speed of about 400 rpm to about 600 rpm.

Advantageously, use of graphene nanoplatelets can result in a slurry with improved flow characteristics that can achieve improved slurry uniformity and dispersion. Without being bound by theory, it is believed that graphene nanoplatelets can beneficially act as flow modifiers due to their layered plate structure. Thus, inclusion of graphene nanoplatelets can beneficially lower the viscosity of the slurry and allow for a higher overall slurry solids content translating to beneficially less solvent in the formulation, which improves the overall processability of the slurry, i.e., the mixing and coating of the slurry. Consequently, the formed electrode can have fewer aggregates and therefore have a more homogeneous conductive network and more uniform current distribution.

In some embodiments, for example, for a smaller scale preparation of a negative electrode, the electrically conductive material can be admixed with the non-aqueous solvent to form a first mixture. The first mixture then can be admixed with the first electroactive material to form a second mixture, and the second mixture can be admixed with polymeric binder to form the slurry.

Alternatively, for example for a larger scale preparation of a negative electrode, the polymeric binder can be admixed with the non-aqueous solvent to form a first mixture. Before, after, or concurrently with formation of the first mixture, the electrically conductive material can be admixed with the non-aqueous solvent to form a second mixture, and the second mixture can be admixed with the first electroactive material to form a third mixture. The first mixture can be admixed with third mixture to form the slurry.

In another large scale preparation of a negative electrode, the polymeric binder can be admixed with the non-aqueous solvent and the first electroactive material to form a first mixture. Before, after, or concurrently with formation of the first mixture, the electrically conductive material can be admixed with the non-aqueous solvent and the polymeric binder (e.g., a smaller amount of polymeric binder to form a second mixture, and the second mixture can be admixed with the first mixture to form the slurry.

In various aspects, the first electroactive material may be present in the slurry in an amount, based on total weight of the slurry, of greater than or equal to about 50 wt %, greater than or equal to about 60 wt %, greater than or equal to about 70 wt %, greater than or equal to about 80 wt %, greater than or equal to about 90 wt %, greater than or equal to about 95 wt %, or about 98 wt %; or from about 50 wt % to about 98 wt %, about 60 wt % to about 95 wt %, about 70 wt % to about 95 wt %, or about 80 wt % to about 95 wt %. Additionally or alternatively, the electrically conductive material may be present in the slurry in an amount, based on total weight of the slurry, of greater than or equal to about 0.2 wt %, greater than or equal to about 1 wt %, greater than or equal to about 5 wt %, greater than or equal to about 10 wt %, greater than or equal to about 15 wt %, greater than or equal to about 20 wt %, or about 25 wt %; or from about 0.2 wt % to about 25 wt %, about 1 wt % to about 25 wt %, about 2 wt % to about 20 wt %, or about 2 wt % to about 10 wt %. Additionally or alternatively, the polymeric binder may be present in the slurry in an amount, based on total weight of the slurry, of greater than or equal to about 0.5 wt %, greater than or equal to about 1 wt %, greater than or equal to about 3 wt %, greater than or equal to about 5 wt %, greater than or equal to about 10 wt %, greater than or equal to about 15 wt %, greater than or equal to about 20 wt %, greater than or equal to about 25 wt %, or about 30 wt %; or from about 0.5 wt % to about 30 wt %, about 1 wt % to about 25 wt %, about 3 wt % to about 20 wt %, or about 3 wt % to about 10 wt %. Additionally or alternatively, the solvent may be present in the slurry in an amount, based on total weight of the slurry, of greater than or equal to about 30 wt %, greater than or equal to about 40 wt %, greater than or equal to about 50 wt %, greater than or equal to about 60 wt %, or about 70 wt %; or from about 30 wt % to about 70 wt %, about 40 wt % to about 70 wt %, 50 wt % to about 70 wt %, or about 60 wt % to about 70 wt %.

In some embodiments, the slurry may include: (i) the first electroactive material in an amount of about 60 wt % to about 95 wt % or about 75 wt % to about 95 wt %, based on total weight of the slurry; (ii) the electrically conductive material in an amount of about 0.2 wt % to about 20 wt % or about 2 wt % to about 20 wt %, based on total weight of the slurry; and (iii) the polymeric binder in an amount of about 1 wt % to about 30 wt % or about 3 wt % to about 20 wt %, based on total weight of the slurry. Overall, the solids content (i.e., the first electroactive material, the electrically conductive material, and the polymeric binder) of the slurry can range from about 20 wt % to about 80 wt % or about 30 wt % to about 70 wt %, based on total weight of the slurry.

Once the slurry is formed, the slurry may be applied to or cast on a current collector (e.g., current collector 32) and volatilized to form the negative electrode. Volatilizing of the slurry can be performed by drying the slurry, for example, in a zone dryer, at a temperature to evaporate the solvent and form the negative electrode. Non-limiting examples of suitable non-aqueous solvents include N-methyl-2-pyrrolidone (NMP), dimethylformamide (DMF), dimethyl sulfoxide (DMSO), propylene carbonate (PC), acetonitrile (CAN), tetrahydrofuran (THF), and combinations thereof. In some embodiments, the solvent may be aprotic, preferably polar.

The methods may include a first heat treatment of the negative electrode comprising heating the formed or dry negative electrode. It has been discovered that this first heat treatment can advantageously result in a negative electrode with a robust mechanical and electrical network that can overcome the challenges discussed above. For example, the negative electrode may be heated at a first temperature of less than or equal to about 500° C., less than or equal to about 400° C., less than or equal to about 350° C., less than or equal to about 300° C., less than or equal to about 200° C., or about 100° C.; or from about 100° C. to about 500° C., about 100° C. to about 400° C., about 200° C. to about 350° C. The first heat treatment may be performed in an inert atmosphere (e.g., nitrogen, argon, under vacuum, etc.) and for a suitable amount of time, for example, about 10 minutes to about 12 hours, depending on the method of heating and the first temperature. For example, heating under a vacuum can take a longer amount of time but be performed at a temperature of about 250° C. to about 300° C.

Additionally or alternatively, the methods may further include a second heat treatment of the negative electrode comprising heating the negative electrode at a second temperature higher than the first temperature of the first heat treatment. For example, the negative electrode may be heated at a second temperature of greater than or equal to about 300° C., greater than or equal to about 400° C., greater than or equal to about 500° C., greater than or equal to about 600° C., greater than or equal to about 800° C., or about 1000° C.; or from about 300° C. to about 1000° C., about 400° C. to about 1000° C., about 400° C. to about 800° C., or about 500° C. to about 800° C. The second heat treatment may be performed in an inert atmosphere (e.g., nitrogen, argon, under vacuum, etc.) or in air and for a suitable amount of time, for example, about 10 minutes to about 6 hours, depending on the method of heating and the second temperature.

The methods disclosed herein are especially well-suited to maximizing specific power and energy density of electrochemical cells, such as lithium ion batteries. Therefore, the inventive electrode materials have certain advantages, like high energy density and high rate capabilities.

EXAMPLES

Unless otherwise indicated silicon particles were used as the electroactive material in the cells formed in the below examples.
General Information
Unless otherwise indicated below, the following materials were used in preparing a slurry for forming a negative electrode:

80 wt % silicon particles (Silgrain® e-Si 408 from Elkem);
10 wt % polyimide binder (U-Varnish from Ube Industries, LTD.);
10 wt % electrically conductive material as specified in the Examples below; and
N-methyl-2-pyrrolidone (NMP) solvent.
The amounts of silicon particles, polyimide binder, and electrically conductive material correspond to a total of 41 wt % solids in the slurry, and 59 wt % NMP solvent was included in the slurry.

Unless otherwise indicated, the electrode slurry was prepared as follows: A first mixture was made with polyimide binder, NMP solvent, and silicon particles. A second mixture was made with electrically conductive material, NMP solvent, and polyimide binder. One third (⅓) portions of the second mixture were added to the first mixture in three respective steps to form the electrode slurry. Each one third portion of the second mixture was blended for about 15 minutes upon addition to the first mixture with a high speed disperser (Primix Homo Disper DH-2.5) at a speed of 500 rpm up to 4000 rpm until blended.

Example 1

A first electrode slurry was made as described above with carbon nanofibers (Pyrograf®-III Carbon Nanofibers HHT Grade from Pyrograf Products, Inc) as the electrically conductive material and coated using a roll to roll process on a large scale coater on non-coated copper current collector (10 μm thickness) to form wet Negative Electrode A. A second electrode slurry was made as described above with graphene nanoplatelets (xGnP® Grade H-5 or R-7 from XG Sciences, Inc.) as the electrically conductive material and coated using a roll to roll process on a large scale coater on non-coated copper current collector (10 μm thickness) to form wet Negative Electrode B. A third electrode slurry was made as described above with carbon black (TimCal Super P® Li carbon black) as the electrically conductive material and coated using a roll to roll process on a large scale coater on non-coated copper current collector (10 μm thickness) to form wet Negative Electrode C.

Figure 3A:
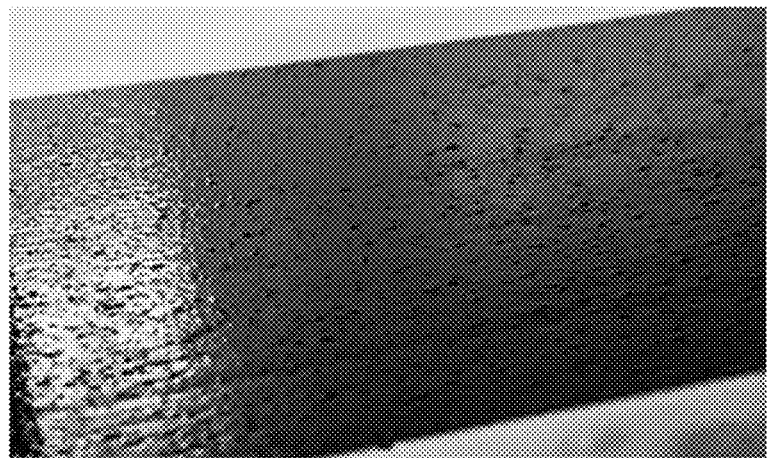
FIG. 3A is a photographic image of wet Negative Electrode A including carbon nanofibers as the electrically conductive material.
Figure 3B:
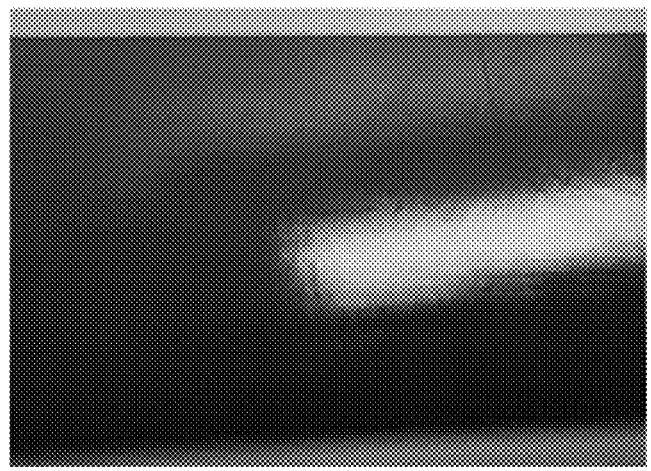
FIG. 3B is a photographic image of wet Negative Electrode B including graphene nanoplatelets as the electrically conductive material.

An image of wet Negative Electrode A is shown in FIG. 3A and an image of wet Negative Electrode B is shown in FIG. 3B. FIGS. 3A and 3B illustrate the impact that the graphene nanoplatelets had on reducing aggregations in the slurry during processing.

The viscosity of the second electrode slurry and the third electrode slurry were measured and shown below in Table 1.

TABLE 1

|  | Solids (Calc) | Viscosity (20 1/s) | Viscosity (50 1/s) | Viscosity (100 1/s) |
| --- | --- | --- | --- | --- |
| Third Electrode Slurry | 41.9% | 3.142 | 2.785 | 2.625 |
| Second Electrode Slurry | 42.8% | 1.572 | 1.119 | 0.9851 |

The graphene nanoplatelets in the second electrode slurry lowered the viscosity of the second electrode slurry as compared to the carbon black in the third electrode slurry by more than half at higher shear rates which contributes positive thixotropic (shear thinning) behavior during the coating process and allows for lower solvent content and faster initial drying rate. The third electrode slurry also contained significant aggregations.

Example 2

Wet negative electrodes 1, 2, and 3 were prepared as described above for wet Negative Electrode B, which were then dried in a 3 zone tunnel dryer to evaporate the NMP solvent to form dry negative electrodes 1, 2, and 3. Dry negative electrodes 1, 2, and 3 were each heat treated to 350° C. for 30 minutes in nitrogen to form finished negative electrodes 1, 2, and 3. Full coin cells (Cells 1, 2, and 3) were formed from each of the finished negative electrodes 1, 2, and 3, a $LiNi_{0.6}Mn_{0.2}Co_{0.2}O_2$ (NMC622) positive electrode with 1.2 M $LiPF_6$ in fluoroethylene carbonate/dimethyl carbonate (FEC/DMC) (1/4, V/V) as the electrolyte. Life cycle testing of Cells 1, 2, and 3 were performed. Cells 1, 2, and 3 went through 2 formation cycles (to develop the SEI layer) at C/20 and then continued on at C/5 for the life test with a voltage window of 4.2V-3.0V.

Figure 4A:
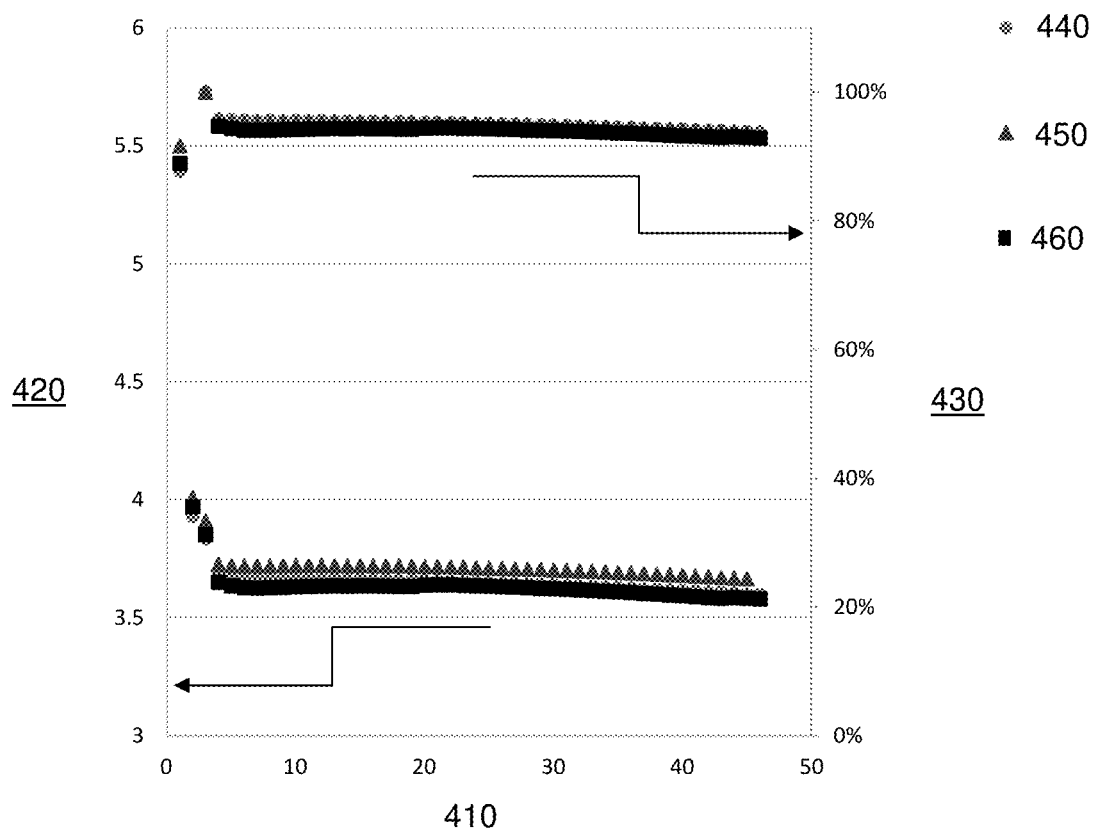
FIG. 4A is a graph depicting charge capacity (mAh/cm$^2$) and charge capacity retention (%) versus cycle number for electrochemical cells formed according to Example 2.
Figure 4B:
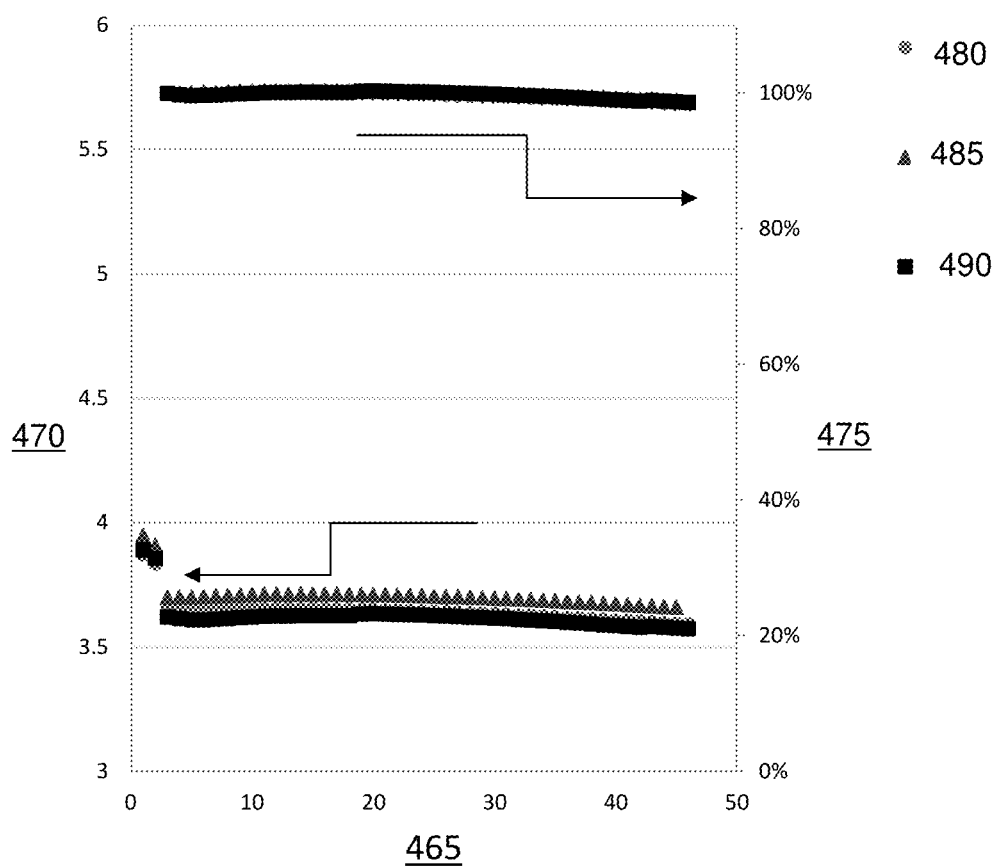
FIG. 4B is a graph depicting discharge capacity (mAh/cm$^2$) and discharge capacity retention (%) versus cycle number for electrochemical cells formed according to Example 2.

The results are shown in FIGS. 4A and 4B. In FIG. 4A, the x-axis (410) is cycle number, while charge capacity ($mAh/cm^2$) is shown on the left hand y-axis (420) and charge capacity retention is shown on the right hand y-axis (430) for Cell 1 (440), Cell 2 (450), and Cell 3 (460). In FIG. 4B, the x-axis (465) is cycle number, while discharge capacity ($mAh/cm^2$) is shown on the left hand y-axis (470) and discharge capacity retention is shown on the right hand y-axis (475) for Cell 1 (480), Cell 2 (485), and Cell 3 (490). Cells 1, 2, and 3 including the graphene nanoplatelets in the negative electrode were highly stable and reproduceable.

Example 3

Wet negative electrode 4 was prepared as described above for wet Negative Electrode C. Wet negative electrode 5 was prepared as described above for wet Negative Electrode A. Wet negative electrode 6 was prepared as described above for wet Negative Electrode B. Wet negative electrodes 4, 5, and 6 were each then dried in a 3 zone tunnel dryer to evaporate the NMP solvent to form dry negative electrodes 4, 5, and 6. Dry negative electrodes 4, 5, and 6 were each heat treated to 350° C. for 30 minutes in a nitrogen environment followed by heat treatment at 700° C. for 6 hours in a nitrogen environment in a tube furnace to form finished negative electrodes 4, 5, and 6. Full coin cells (Cells 4, 5, and 6) were formed from respective finished negative electrodes 4, 5, and 6, a $LiNi_{0.6}Mn_{0.2}Co_{0.2}O_2$ (NMC622) positive electrode with 1.2 M $LiPF_6$ in fluoroethylene carbonate/ dimethyl carbonate (FEC/DMC) (1/4, V/V) as the electrolyte. Cells 4, 5, and 6 were cycled to demonstrate their rate capability and determine whether they were capable of fast charge. Cycling protocol began with 2 cycles at C/20 for formation followed by 5 cycles at each rate: C/10, C/5, C/3, 1C, 2C. Then Cells 4, 5, and 6 were expected to recover to C/5 for further life cycle evaluation.

Figure 5:
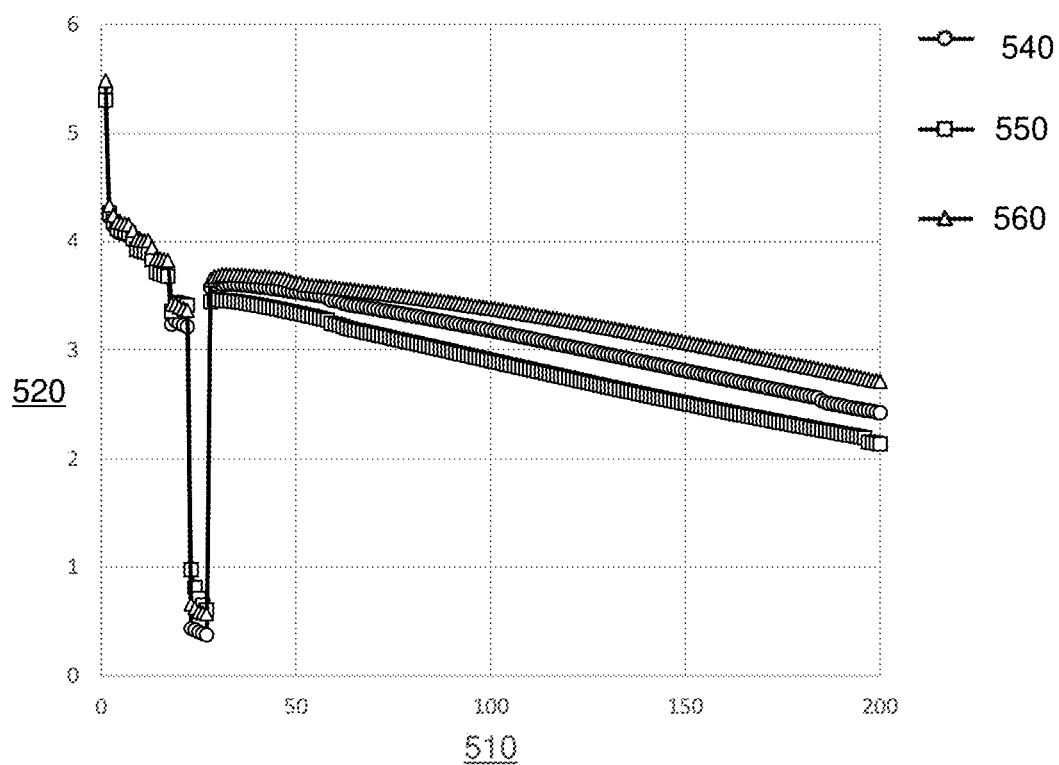
FIG. 5 is a graph depicting charge capacity (mAh/cm$^2$) versus cycle number for electrochemical cells formed according to Example 3.

The results are shown in FIG. 5. In FIG. 5, the x-axis (510) is cycle number, while charge capacity ($mAh/cm^2$) is shown on the left hand y-axis (520) for Cell 4 (540), Cell 5 (550), and Cell 6 (560). Cell 6 containing graphene nanoplatelets in the negative electrode carried the best average overall charge capacity.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A negative electrode comprising:
   a first electroactive material comprising silicon-containing particles having an average particle diameter of at least about 1 micrometer;
   an electrically conductive material comprising graphene nanoplatelets, wherein the graphene nanoplatelets have an average particle diameter of about 1 micrometer to about 25 micrometers; and
   a polymeric binder comprising a polyimide, a polyamide, polyacrylonitrile, polyacrylic acid, a salt of polyacrylic acid, polyacrylamide, polyvinyl alcohol, carboxymethyl cellulose, or a combination thereof.

2. The negative electrode of claim 1, wherein the silicon-containing particles have an average particle diameter of about 1 micrometers to about 15 micrometers; and wherein the graphene nanoplatelets have: a thickness of less than or equal to about 100 nm.

3. The negative electrode of claim 1, wherein the silicon-containing particles comprise silicon, carbon coated silicon, a silicon oxide, a lithium silicon alloy, a silicon tin alloy, a silicon iron alloy, a silicon aluminum alloy, a silicon cobalt alloy, or a combination thereof.

4. The negative electrode of claim 1, wherein the electrically conductive material further comprises carbon black, acetylene black, graphite, carbon nanotubes, carbon fibers, carbon nanofibers, graphene, graphene oxide, nitrogen-doped carbon, a metallic powder, a liquid metal, a conductive polymer, or a combination thereof.

5. The negative electrode of claim 1, wherein:
   (i) the first electroactive material is present in the negative electrode in an amount of about 60 wt % to about 95 wt %, based on total weight of the negative electrode;
   (ii) the electrically conductive material is present in the negative electrode in an amount of about 2 wt % to about 20 wt %, based on total weight of the negative electrode; and
   (iii) the polymeric binder is present in the negative electrode in an amount of about 3 wt % to about 20 wt %, based on total weight of the negative electrode.

6. An electrochemical cell comprising:
   a negative electrode comprising:
      a first electroactive material comprising silicon-containing particles having an average particle diameter of greater than or equal to about 1 μm;
      an electrically conductive material comprising graphene nanoplatelets, wherein the graphene nanoplatelets have an average particle diameter of about 1 micrometer to about 25 micrometers; and
      a polymeric binder comprising a polyimide, a polyamide, polyacrylonitrile, polyacrylic acid, a salt of polyacrylic acid, polyacrylamide, polyvinyl alcohol, carboxymethyl cellulose, or a combination thereof;
   a positive electrode comprising a second electroactive material, wherein the positive electrode is spaced apart from the negative electrode;
   a porous separator disposed between confronting surfaces of the negative electrode and the positive electrode; and
   a liquid electrolyte infiltrating the negative electrode, the positive electrode, and the porous separator.

7. The electrochemical cell of claim 6, wherein the silicon-containing particles have an average particle diameter of about 1 micrometer to about 15 micrometers; and wherein the graphene nanoplatelets have a thickness of less than or equal to about 100 nm.

8. The electrochemical cell of claim 6, wherein the silicon-containing particles comprise silicon, carbon coated silicon, a silicon oxide, a lithium silicon alloy, a silicon tin alloy, a silicon iron alloy, a silicon aluminum alloy, a silicon cobalt alloy, or a combination thereof.

9. The electrochemical cell of claim 6, wherein the electrically conductive material further comprises carbon black, acetylene black, graphite, carbon nanotubes, carbon fibers, carbon nanofibers, graphene, graphene oxide, nitrogen-doped carbon, a metallic powder, a liquid metal, a conductive polymer, or a combination thereof.

10. The electrochemical cell of claim 6, wherein:
 (i) the first electroactive material is present in the negative electrode in an amount of about 60 wt % to about 95 wt %, based on total weight of the negative electrode;
 (ii) the electrically conductive material is present in the negative electrode in an amount of about 2 wt % to about 20 wt %, based on total weight of the negative electrode; and
 (iii) the polymeric binder is present in the negative electrode in an amount of about 3 wt % to about 20 wt %, based on total weight of the negative electrode.

11. The electrochemical cell of claim 6, wherein the second electroactive material is selected from the group consisting of $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 < y \leq 1$, $0 \leq z \leq 1$, and $x+y+z=1$; $LiNi_{(1-x-y)}Co_xM_yO_2$, where $0 < x < 0.2$, $y < 0.2$, and M is Al, Mg, or Ti; $LiFePO_4$, $LiMn_{2-x}Fe_xPO_4$, where $0 < x < 0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2FePO_4F$; $LiMn_2O_4$; $LiFeSiO_4$; $LiNi_{0.6}Mn_{0.2}Co_{0.2}O_2$ (NMC622), $LiMnO_2$ (LMO), activated carbon, sulfur, and a combination thereof.

12. The electrochemical cell of claim 6, wherein the electrochemical cell has a negative electrode capacity for lithium to positive electrode capacity for lithium (N/P) ratio of about 1 to about 3.

13. A method of preparing a negative electrode, wherein the method comprises:
 admixing a first electroactive material comprising silicon-containing particles having an average particle diameter of greater than or equal to about 1 micrometer with an electrically conductive material comprising graphene nanoplatelets having an average particle diameter of about 1 micrometers to about 25 micrometers, a polymeric binder comprising a polyimide, a polyamide, polyacrylonitrile, polyacrylic acid, a salt of polyacrylic acid, polyacrylamide, polyvinyl alcohol, carboxymethyl cellulose, or a combination thereof, and a non-aqueous solvent to form a slurry;
 applying the slurry to a current collector and volatilizing the slurry to form the negative electrode; and
 a first heat treatment of the negative electrode comprising heating the negative electrode at a first temperature of less than or equal to about 400° C.

14. The method of claim 13, wherein:
 (i) the electrically conductive material is admixed with the non-aqueous solvent to form a first mixture, the first mixture is admixed with the first electroactive material to form a second mixture, and the second mixture is admixed with polymeric binder to form the slurry; or
 (ii) the polymeric binder is admixed with the non-aqueous solvent to form a first mixture, the electrically conductive material is admixed with the non-aqueous solvent to form a second mixture, the second mixture is admixed with the first electroactive material to form a third mixture, and the first mixture is admixed with third mixture to form the slurry; or
 (iii) the polymeric binder is admixed with the non-aqueous solvent and the first electroactive material to form a first mixture, the electrically conductive material is admixed with the non-aqueous solvent and the polymeric binder to form a second mixture, and the first mixture is admixed with the second mixture to form the slurry.

15. The method of claim 13, wherein the silicon-containing particles have an average particle diameter of about 1 micrometer to about 15 micrometers; and wherein the graphene nanoplatelets have a thickness of less than or equal to about 100 nm.

16. The method of claim 13, wherein the silicon-containing particles comprise silicon, carbon coated silicon, a silicon oxide, a lithium silicon alloy, a silicon tin alloy, a silicon iron alloy, a silicon aluminum alloy, a silicon cobalt alloy, or a combination thereof; and wherein the non-aqueous solvent is selected from the group consisting of N-methyl-2-pyrrolidone (NMP), dimethylformamide (DMF), dimethyl sulfoxide, propylene carbonate, acetonitrile, tetrahydrofuran, and a combination thereof.

17. The method of claim 13, wherein the electrically conductive material further comprises carbon black, acetylene black, graphite, carbon nanotubes, carbon fibers, carbon nanofibers, graphene, graphene oxide, nitrogen-doped carbon, a metallic powder, a liquid metal, a conductive polymer, or a combination thereof.

18. The method of claim 13, wherein the slurry comprises:
 (i) about 60 wt % to about 95 wt % of the first electroactive material, based on total weight of the slurry;
 (ii) about 2 wt % to about 20 wt % of the first electroactive material, based on total weight of the slurry; and
 (iii) about 3 wt % to about 20 wt % of the polymeric binder, based on total weight of the slurry.

19. The method of claim 13, further comprising a second heat treatment of the negative electrode comprising heating the negative electrode at a second temperature of greater than or equal to about 400° C.

20. The negative electrode of claim 1, wherein the polymeric binder is present as a matrix and the electroactive material and the electrically conductive material are dispersed within the matrix.

* * * * *